(12) United States Patent
Wang et al.

(10) Patent No.: US 12,267,096 B2
(45) Date of Patent: Apr. 1, 2025

(54) PIM CANCELLATION METHOD AND APPARATUS

(71) Applicant: Huawei Technologies Co., Ltd., Shenzhen (CN)

(72) Inventors: Hao Wang, Dongguan (CN); Jianping Zhong, Shenzhen (CN); Lei Wang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 283 days.

(21) Appl. No.: 17/653,980

(22) Filed: Mar. 8, 2022

(65) Prior Publication Data

US 2022/0209803 A1    Jun. 30, 2022

Related U.S. Application Data

(63) Continuation of application No. PCT/CN2019/104892, filed on Sep. 9, 2019.

(51) Int. Cl.
*H04B 1/10* (2006.01)
*H04B 1/04* (2006.01)

(52) U.S. Cl.
CPC ......... *H04B 1/1027* (2013.01); *H04B 1/0475* (2013.01); *H04B 1/1081* (2013.01); *H04B 2001/1045* (2013.01)

(58) Field of Classification Search
CPC ... H04B 1/1027; H04B 1/0475; H04B 1/1081
See application file for complete search history.

(56) References Cited

U.S. PATENT DOCUMENTS

| 10,038,522 B1 | 7/2018 | Ju et al. |
| 2015/0244414 A1 | 8/2015 | Yu et al. |

(Continued)

FOREIGN PATENT DOCUMENTS

| CN | 104283580 A | 1/2015 |
| CN | 104716972 A | 6/2015 |

(Continued)

OTHER PUBLICATIONS

Yang, J., et al., "The Method of Eliminating Nonlinear Effect for Radio Frequency Module", Journal of National University of Defense Technology, vol. 32, No. 4, Aug. 15, 2010, 5 pages.

*Primary Examiner* — Curtis B Odom
(74) *Attorney, Agent, or Firm* — Slater Matsil, LLP

(57) ABSTRACT

A PIM cancellation apparatus includes: a first obtaining unit, configured to obtain digital signals of N transmit channels; a second obtaining unit, configured to obtain receive signals; and a PIM simulation unit, configured to obtain N PIM cancellation signals based on the digital signals of the N transmit channels, where the PIM simulation unit includes a first linear module performing first filtering and first linear superposition on the digital signals of the N transmit channels to obtain a first linear superposition result, a non-linear module performing non-linear processing on the first linear superposition result to obtain a non-linear processing result, and each filter in a second linear module performing linear processing on each corresponding non-linear processing result to determine one PIM cancellation signal, to obtain the N PIM cancellation signals; and a cancellation unit, configured to obtain N cancellation result signals.

20 Claims, 11 Drawing Sheets

(56) References Cited

U.S. PATENT DOCUMENTS

| | | |
|---|---|---|
| 2017/0201277 A1 | 7/2017 | Wang et al. |
| 2019/0052294 A1 | 2/2019 | Abdelmonem |
| 2019/0253098 A1 | 8/2019 | Lv et al. |
| 2022/0182087 A1* | 6/2022 | Ellgardt ............... H04B 1/1036 |
| 2022/0263588 A1* | 8/2022 | Fleischer ............. H04B 1/1036 |

FOREIGN PATENT DOCUMENTS

| | | |
|---|---|---|
| CN | 103986482 A | 2/2016 |
| CN | 107453782 A | 12/2017 |
| CN | 108777585 A | 11/2018 |
| CN | 109845118 A | 6/2019 |
| WO | 2009082084 A1 | 7/2009 |
| WO | 2012161632 A1 | 11/2012 |
| WO | 2019080124 A1 | 5/2019 |
| WO | 2020132893 A1 | 7/2020 |

* cited by examiner

PIM CANCELLATION METHOD AND APPARATUS

CROSS-REFERENCE TO RELATED APPLICATIONS

This application is a continuation of International Application No. PCT/CN2019/104892, filed on Sep. 9, 2019, which is hereby incorporated by reference in its entirety.

TECHNICAL FIELD

This application relates to the communication field, and in particular, to a PIM cancellation method and apparatus.

BACKGROUND

In a multi-carrier base station communication system in a frequency division duplexing (FDD) standard, in a multi-carrier and high-transmit-bandwidth scenario, a passive intermodulation (PIM) signal is generated in an antenna system due to reasons such as a defective part, screw loosening, and vibration. When the PIM signal falls on a frequency band of a receive signal, the PIM signal coincides with a spectrum of the receive signal, and consequently, sensitivity of a receive channel is affected, and an uplink throughput is therefore affected.

FIG. 1 is a schematic diagram of a principle of PIM signal cancellation. A frequency band on which a transmit (TX) signal is located is expressed as a TX frequency band, and a frequency band on which a receive (RX) signal is located is expressed as an RX frequency band. When the PIM signal falls on the RX frequency band, the PIM signal coincides with the receive signal. To cancel the PIM signal, a generation mechanism and a behavior feature of the PIM signal are studied, so that the PIM signal can be mathematically modeled based on a transmit signal, and then the PIM signal is adaptively fitted; and then, the PIM signal is removed from the receive signal, to obtain a signal that is on the RX frequency band and that has no interference from the PIM signal, to eliminate impact exerted by the PIM signal on receiving sensitivity. Based on a PIM cancellation algorithm shown in FIG. 1, a PIM canceller is designed to eliminate impact of a PIM fault.

However, with development of communication technologies, a quantity of transmit channels and a quantity of receive channels gradually increase, and a base station using a multiple-input multiple-output (MIMO) technology becomes a mainstream. In a MIMO communication system, referring to FIG. 2, transmit signals of a plurality of channels are shown by lines with an upward arrow in FIG. 2. If a metal object exists outside an antenna system, or hardware of a base station has a defective part, a screw is loose, or vibration occurs, transmit signals of a plurality of channels may be mixed in space and form PIM. The PIM is referred to as radiation PIM. In this case, the receive signal includes the radiation PIM, as shown by a line with a downward arrow in FIG. 2. A feature of the radiation PIM is that there is correlation between the radiation PIM and the transmit signals of the plurality of channels, and it is difficult to actually simulate a generation mechanism and a behavior feature of the radiation PIM, and a plurality of receive channels are affected at the same time. Therefore, it is difficult to model a cancellation algorithm for multi-channel PIM, and difficulty in cancelling a multi-channel PIM signal is increased.

Currently, there is no perfect PIM cancellation method for a MIMO scenario.

SUMMARY

Embodiments of this application provide a PIM cancellation method and apparatus, so that there is no need to construct one PIM simulation unit for each receive channel, to reduce occupation of chip resources during PIM signal cancellation.

To resolve the foregoing technical problem, the embodiments of this application provide the following technical solutions.

A first aspect of the embodiments of this application provides a passive intermodulation PIM cancellation apparatus, and the PIM cancellation apparatus provided in this application includes a first obtaining unit, a second obtaining unit, a PIM simulation unit, and a cancellation unit. The first obtaining unit is configured to obtain digital signals of N transmit channels, where N is an integer greater than 1. The second obtaining unit is configured to obtain receive signals of N receive channels, where the receive signals include a PIM signal, and the PIM signal is generated from the digital signals of the N transmit channels. The PIM simulation unit is connected to the first obtaining unit, and one PIM simulation unit is integrated into a chip and is configured to obtain N PIM cancellation signals based on the digital signals of the N transmit channels, where the PIM cancellation signal is used to cancel the PIM signal in the receive signals. The PIM simulation unit includes a first linear module, a non-linear module, and a second linear module that are connected in series. The first linear module is configured to perform first filtering and first linear superposition on the digital signals of the N transmit channels to obtain a first linear superposition result. The non-linear module is configured to perform non-linear processing on the first linear superposition result to obtain a non-linear processing result. The second linear module includes N filters, where a filtering coefficient of each filter corresponds to one receive channel, and each filter is configured to perform linear processing on the non-linear processing result to determine one PIM cancellation signal, so that the N PIM cancellation signals are obtained by using the second linear module. The cancellation unit connected to the second obtaining unit and the PIM simulation unit may obtain N cancellation result signals based on the receive signals and the N PIM cancellation signals. A PIM cancellation signal in a MIMO communication system can be accurately simulated by using the apparatus, to cancel a PIM signal. In addition, because the N receive channels multiplex a same second linear module, a PIM cancellation signal corresponding to each receive channel may be obtained by using one second linear module, and there is no need to construct one PIM simulation unit for each receive channel. In this way, occupation of chip resources during PIM signal cancellation is reduced.

In a first implementation of the first aspect of the embodiments of this application, if radiation PIM in a multiple-input multiple-output MIMO communication system is formed at one PIM source, the PIM cancellation apparatus includes one PIM simulation unit.

In a second implementation of the first aspect of the embodiments of this application, generally, one PIM simulation unit may be configured to simulate a PIM signal formed at one PIM source, and therefore, when radiation PIM in a multi-channel MIMO communication system is formed at a plurality of (M) PIM sources, the PIM cancellation apparatus may include M PIM simulation units that are connected in parallel.

Further, in a third implementation of the first aspect of the embodiments of this application, a PIM signal formed at each PIM source affects a receive signal corresponding to the receive channel. Therefore, to cancel a PIM signal in the receive signal, an integrated PIM signal formed at the M PIM sources needs to be obtained, to eliminate impact exerted on the receive signal by the PIM signal formed at the M PIM sources. Therefore, the PIM cancellation apparatus further includes a combiner unit. The cancellation unit is connected to each PIM simulation unit by using the combiner unit. The combiner unit may add PIM cancellation signals corresponding to a same receive channel that are obtained by the M PIM simulation units, to obtain the N PIM cancellation signals.

In a fourth implementation of the first aspect of the embodiments of this application, because locations of a plurality of PIM sources may be different, different time is used when digital signals (TX signals) of transmit channels are formed at different PIM sources, but the PIM cancellation apparatus performs PIM cancellation at a same time. To compensate for a time difference of the TX signals formed at the different PIM sources, in some cases, the PIM cancellation apparatus further includes M delay configuration units. The PIM simulation unit is connected to the first obtaining unit by using the delay configuration unit. Each delay configuration unit is configured to separately configure delay values for the digital signals of the N transmit channels, and delay values configured by different delay configuration units are different. In this case, the first obtaining unit obtains a digital signal configured with the delay value.

In a fifth implementation of the first aspect of the embodiments of this application, if a quantity of taps of filters in the first linear module and the second linear module is reduced, the PIM cancellation apparatus further includes a third linear module and a fourth linear module. The third linear module is connected to each delay configuration unit, and is configured to separately perform second filtering on the digital signals of the N transmit channels to obtain filtered digital signals. In this case, the delay configuration unit may separately configure delay values for the digital signals obtained after the N transmit channels are filtered. The fourth linear module is connected to the combiner unit, and is configured to perform third filtering on the N PIM cancellation signals. The quantity of taps of the filters in the first linear module and the second linear module is less than a quantity of taps of filters in the third linear module and the fourth linear module. Therefore, the cancellation unit may obtain the N cancellation result signals based on the receive signals and the N PIM cancellation signals on which the third filtering is performed. When the radiation PIM applied to the MIMO communication system is formed at a plurality of PIM sources, a quantity of required chip resources can be reduced.

In a sixth implementation of the first aspect of the embodiments of this application, the first linear module includes a filter and a first linear superimposer, a filtering coefficient of each filter corresponds to one transmit channel, each filter is configured to perform first filtering on a digital signal of one transmit channel to obtain one first filtering result, and the first linear superimposer is configured to perform first linear superposition on N first filtering results to obtain one first linear superposition result.

In a seventh implementation of the first aspect of the embodiments of this application, the MIMO communication system includes a plurality of chips, and signal transmission channels are established between the plurality of chips, so that each chip processes digital signals of N transmit channels and receive signals of N receive channels, and each chip processes NTNR signals.

Locations of the PIM cancellation apparatus in the MIMO communication system are flexible and variable, and the PIM cancellation apparatus may be disposed at different locations in the MIMO communication system.

In an eighth implementation of the first aspect of the embodiments of this application, the PIM cancellation apparatus is disposed at a location of an intermediate radio frequency digital front end, and in this case, the digital signal is a channel-level signal.

To further reduce the quantity of required chip resources, in a ninth implementation of the first aspect of the embodiments of this application, the PIM cancellation apparatus is disposed at a baseband location, and in this case, the digital signal is a carrier-level signal.

A second aspect of the embodiments of this application provides a passive intermodulation PIM cancellation method, and the method includes: obtaining digital signals of N transmit channels, where N is an integer greater than 1; obtaining receive signals of N receive channels, where the receive signals include a PIM signal, and the PIM signal is generated from the digital signals of the N transmit channels; obtaining N PIM cancellation signals based on the digital signals of the N transmit channels, where the PIM cancellation signal is used to cancel the PIM signal in the receive signals; and the obtaining N PIM cancellation signals based on the digital signals of the N transmit channels includes: performing first filtering and first linear superposition on the digital signals of the N transmit channels to obtain a first linear superposition result; performing non-linear processing on the first linear superposition result to obtain a non-linear processing result; and performing linear processing on the non-linear processing result by using each filter to determine one PIM cancellation signal, where a filtering coefficient of each filter corresponds to one receive channel, so that the N PIM cancellation signals are obtained; and obtaining N cancellation result signals based on the receive signals and the N PIM cancellation signals.

In a first implementation of the second aspect of the embodiments of this application, if radiation PIM in a multiple-input multiple-output MIMO communication system is formed at one PIM source, the step of obtaining N PIM cancellation signals based on the digital signals of the N transmit channels is performed by one PIM simulation unit.

In a second implementation of the second aspect of the embodiments of this application, if radiation PIM in a multiple-input multiple-output MIMO communication system is formed at M PIM sources, the step of obtaining N PIM cancellation signals based on the digital signals of the N transmit channels is performed by M PIM simulation units that are connected in parallel.

In a third implementation of the second aspect of the embodiments of this application, the method further includes: adding PIM cancellation signals corresponding to a same receive channel, to obtain the N PIM cancellation signals.

In a fourth implementation of the second aspect of the embodiments of this application, the method further includes: separately configuring delay values for the digital signals of the N transmit channels, where delay values configured by different delay configuration units are different; and the obtaining digital signals of N transmit channels includes: obtaining a digital signal configured with the delay value.

In a fifth implementation of the second aspect of the embodiments of this application, the method further includes: performing second filtering on the digital signals of the N transmit channels to obtain filtered digital signals; and the separately configuring delay values for the digital signals of the N transmit channels includes: separately configuring delay values for the digital signals obtained after the N transmit channels are filtered; performing third filtering on the N PIM cancellation signals; and obtaining the N cancellation result signals based on the receive signals and the N PIM cancellation signals on which the third filtering is performed.

In a sixth implementation of the second aspect of the embodiments of this application, the performing first filtering and first linear superposition on the digital signals of the N transmit channels to obtain a first linear superposition result includes: performing first filtering on a digital signal of one transmit channel to obtain one first filtering result, and performing first linear superposition on N first filtering results to obtain one first linear superposition result.

In a seventh implementation of the second aspect of the embodiments of this application, the MIMO communication system includes a plurality of chips, and signal transmission channels are established between the plurality of chips, so that each chip processes digital signals of N transmit channels and receive signals of N receive channels.

In an eighth implementation of the second aspect of the embodiments of this application, the digital signal is a channel-level signal.

In a ninth implementation of the second aspect of the embodiments of this application, the digital signal is a carrier-level signal.

A third aspect of the embodiments of this application provides a device, where the device includes a processor and a memory, and the processor and the memory communicate with each other.

The memory is configured to store instructions.

The processor is configured to execute the instructions in the memory, to perform the PIM cancellation method according to any implementation of the second aspect.

A fourth aspect of the embodiments of this application provides a computer-readable storage medium, including instructions, and when the instructions are run on a computer, the computer is enabled to perform the PIM cancellation method according to any implementation of the second aspect.

A fifth aspect of the embodiments of this application provides a computer program product, including instructions, and when the computer program product is run on a computer, the computer is enabled to perform the PIM cancellation method according to any implementation of the second aspect.

DETAILED DESCRIPTION OF ILLUSTRATIVE EMBODIMENTS

Figure 1:
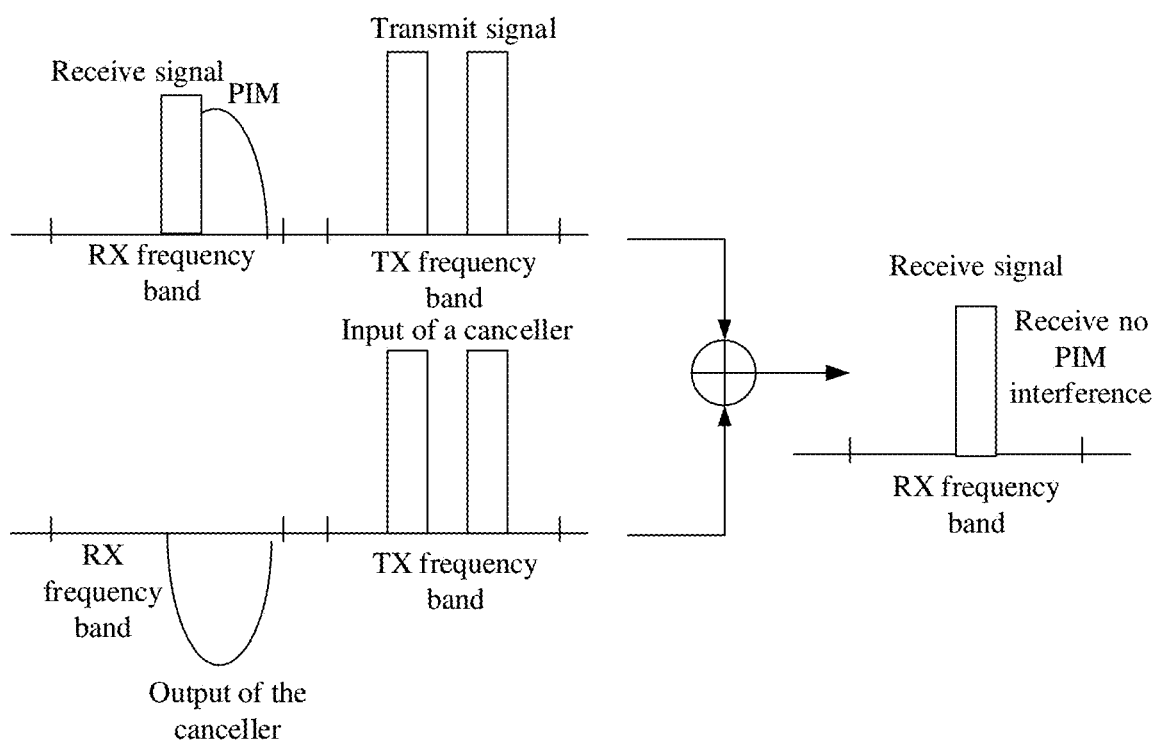
FIG. 1 is a schematic diagram of a principle of PIM signal cancellation.
Figure 2:
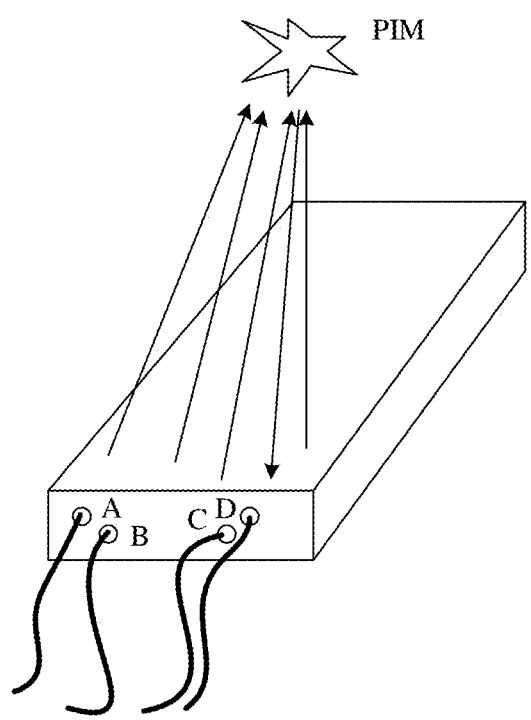
FIG. 2 is a diagram of an architecture of signal transmission in a MIMO communication system.

To make a person skilled in the art understand the solutions in this application better, the following describes the technical solutions in the embodiments of this application with reference to the accompanying drawings in the embodiments of this application.

In this application, terms such as "first", "second", "third", and "fourth" (if exists) in the specification, the claims, and the accompanying drawings are intended to distinguish between similar objects but do not necessarily indicate a specific order or sequence. It should be understood that data used in this way may be interchanged in appropriate cases, so that the embodiments of this application described herein are implemented in a sequence other than those shown or described in this application. In addition, the terms "include", "contain" and any other variants mean to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In a MIMO communication system, a quantity of transmit channels and a quantity of receive channels are up to 32, 64, or even 128. In this case, a feature of PIM is that there is correlation between transmit signals of a plurality of channels, and a plurality of receive channels are affected at the same time. Therefore, it is difficult to simulate a PIM signal, and difficulty in cancelling a PIM signal is increased.

In the MIMO communication system, after multi-channel transmit signals are combined to form PIM, PIM signals falling on different receive channels belong to a same source, and processes of forming PIM on a plurality of receive channels are consistent. Therefore, PIM of the plurality of receive channels may multiplex a same set of PIM simulation units. Therefore, embodiments of this application provide a passive intermodulation PIM cancellation method and apparatus, to accurately simulate a PIM cancellation signal in a MIMO communication system to cancel a PIM signal. In addition, because N receive channels multiplex a same second linear module, a PIM cancellation signal corresponding to each receive channel may be obtained by using one second linear module, and there is no need to construct one PIM simulation unit for each receive channel. In this way, occupation of chip resources during PIM signal cancellation is reduced.

The passive intermodulation PIM cancellation method and apparatus provided in the embodiments of this application may be applied to a multi-carrier base station communication system in an FDD standard. The PIM cancellation apparatus may be a base station, an eNB, a gNB, or the like based on different communication protocols used in the communication system, such as a 4th generation (4G) communication protocol and a 5th generation (5G) communication protocol. This is not limited in this application.

Figure 3:
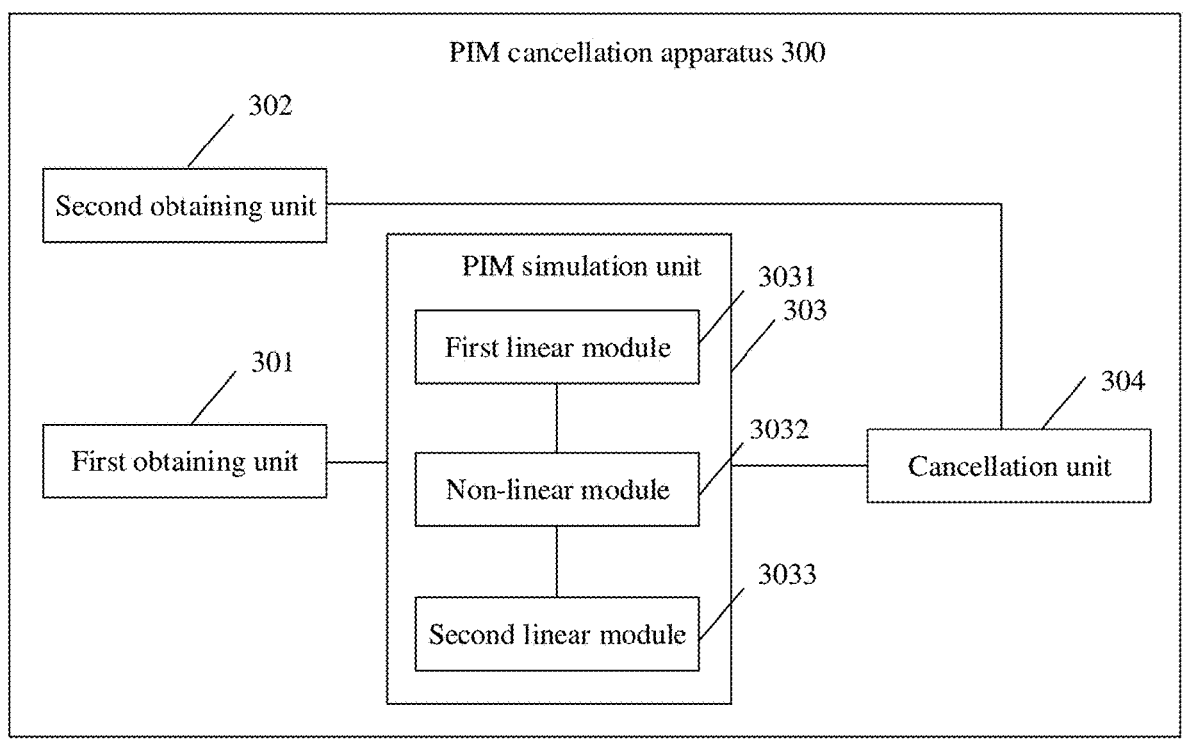
FIG. 3 is a diagram of a structure of a PIM cancellation apparatus according to an embodiment of this application.

Then, a passive intermodulation PIM cancellation apparatus provided in an embodiment of this application is described with reference to the accompanying drawings. Referring to FIG. 3, a PIM cancellation apparatus 300 includes a first obtaining unit 301, a second obtaining unit 302, a PIM simulation unit 303, and a cancellation unit 304.

The first obtaining unit 301 is configured to obtain digital signals of N transmit channels.

The second obtaining unit 302 is configured to obtain receive signals of N receive channels, where the receive signals include a PIM signal, and the PIM signal is generated from the digital signals of the N transmit channels.

It may be understood that, in this embodiment, a quantity of transmit channels and a quantity of receive channels in a MIMO communication system are the same and are both N. N is an integer greater than 1. In a common MIMO communication system, N may be 32, 64, 128, or the like.

It should be noted that, in the MIMO communication system, signal processing for N channels is usually performed by a plurality of chips jointly, such as H chips, and there is no signal transmission between the chips. A typical use case is N=32 and H=4. Each chip processes eight input signals and eight output signals, that is, 8T8R signals. The PIM cancellation apparatus provided in this embodiment of this application cannot only process the digital signals of the N transmit channels at the same time, but the N receive channels also multiplex a same second linear module. It is clear that each chip needs to process NTNR signals. Therefore, signal transmission channels may be established between a plurality of chips, so that a TX signal and an RX signal are shared between different chips. In this way, each chip can process digital signals of N transmit channels and receive signals of N receive channels.

Figure 4:
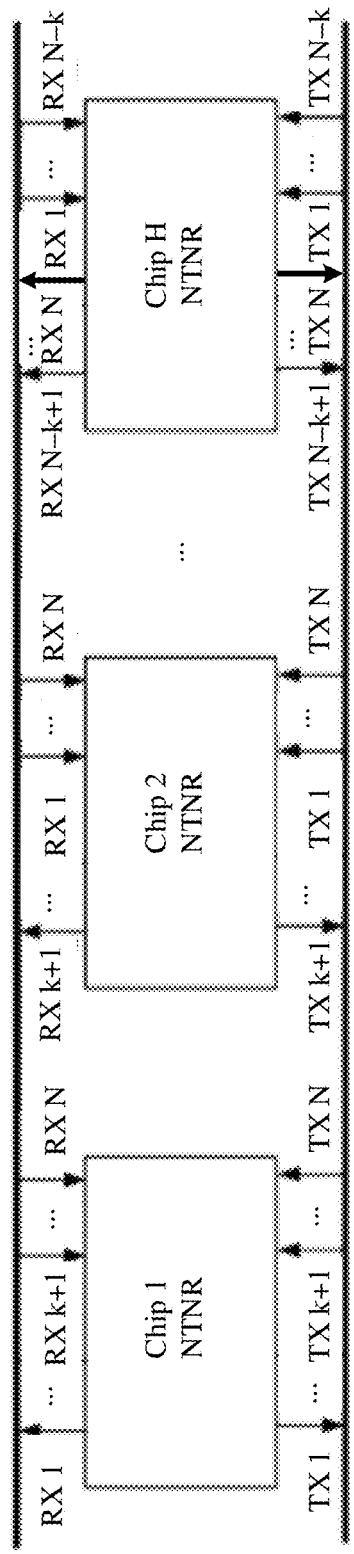
FIG. 4 is a diagram of a structure of a cross-chip joint architecture according to an embodiment of this application.

For a cross-chip joint architecture obtained after signal transmission channels may be established between a plurality of chips, refer to FIG. 4. Signal transmission channels for N-channel TX and N-channel RX are designed between a chip 1, a chip 2, . . . , and a chip H. In this way, when the chip 1 is used as an example, the chip 1 may obtain a TX signal and an RX signal of another chip, and may also send a TX signal and an RX signal to another chip, so that each chip processes NTNR signals.

The PIM simulation unit 303 is connected to the first obtaining unit 301, one PIM simulation unit is integrated into a chip, and the PIM simulation unit 303 obtains N PIM cancellation signals based on the digital signals of the N transmit channels, where the PIM cancellation signal is used to cancel the PIM signal in the receive signals. In this embodiment, to accurately simulate the PIM cancellation signal by using the PIM simulation unit 303, the PIM simulation unit 303 may include a first linear module 3031, a non-linear module 3032, and a second linear module 3033 that are connected in series. The first linear module 3031 is configured to perform first filtering and first linear superposition on the digital signals of the N transmit channels to obtain a first linear superposition result. The non-linear module 3032 is configured to perform non-linear processing on the first linear superposition result to obtain a non-linear processing result. The second linear module 3033 includes N filters, a filtering coefficient of each filter corresponds to one receive channel, and each filter is configured to perform linear processing on the non-linear processing result to determine one PIM cancellation signal, so that the N PIM cancellation signals are obtained by using the second linear module.

The cancellation unit 304 is connected to the second obtaining unit 302 and the PIM simulation unit 303, and is configured to obtain N cancellation result signals based on the receive signals and the N PIM cancellation signals, to cancel a PIM signal in the MIMO communication system.

Figure 5:
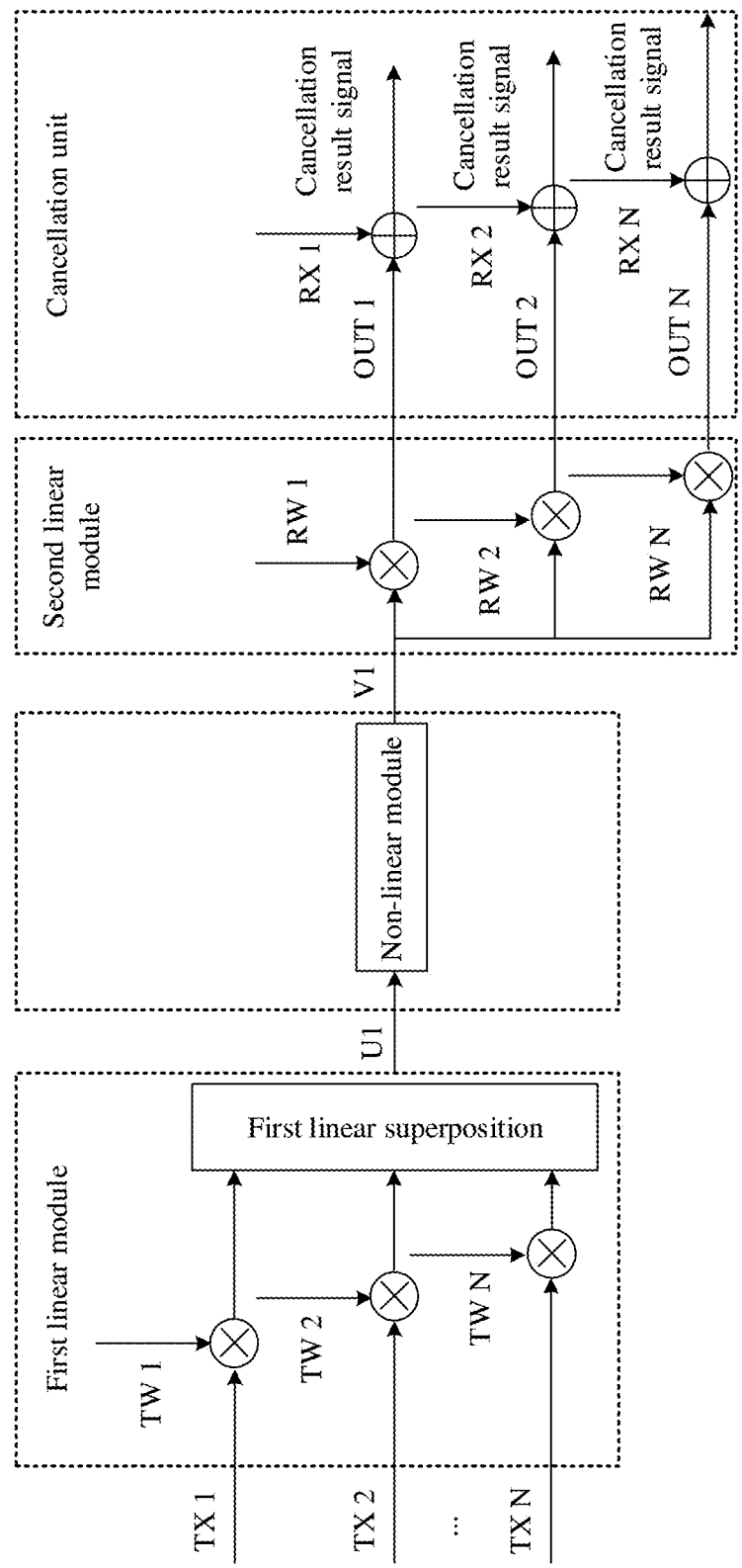
FIG. 5 is a diagram of a structure of a PIM cancellation apparatus according to an embodiment of this application.

When the PIM cancellation apparatus provided in the embodiment corresponding to FIG. 3 is used to cancel the PIM signal in the MIMO communication system, for a flowchart of an architecture of PIM cancellation, refer to FIG. 5. The MIMO communication system includes N transmit channels and N receive channels. A digital signal of the transmit channel may be expressed as TX, and therefore the digital signals of the N transmit channels may be separately expressed as TX 1, TX 2, . . . , and TX N. A receive signal of the receive channel may be expressed as RX, and therefore the receive signals of the N receive channels may be expressed as RX 1, RX 2, . . . , and RX N. After the first obtaining unit 301 obtains the digital signals TX 1, TX 2, . . . , and TX N of the N transmit channels, the first linear module 3031 in the PIM simulation unit 303 performs first filtering and first linear superposition on the digital signals of the N transmit channels to obtain a first linear superposition result, and the first linear superposition result may be expressed as U1. The non-linear module 3032 performs non-linear processing on the first linear superposition result U1 to obtain a non-linear processing result, and the non-linear processing result may be expressed as V1. Each filter in the second linear module 3033 performs linear processing on the non-linear processing result to determine one PIM cancellation signal, and the PIM cancellation signal determined by each filter corresponds to one receive channel, to cancel a PIM signal in the receive signals of the receive channels. Therefore, the N PIM cancellation signals obtained by the second linear module 3033 may be separately expressed as OUT 1, OUT 2, . . . , and OUT N. Then, the cancellation unit 304 may obtain N cancellation result signals based on the receive signals and the N PIM cancellation signals. For example, subtractive processing may be performed on a receive signal of each receive channel and a corresponding PIM signal, in other words, subtractive processing is performed on RX 1 and OUT 1, subtractive processing is performed on RX 2 and OUT 2, . . . , and subtractive processing is performed on RX N and OUT N, to obtain the N cancellation result signals, to cancel the PIM signal in the MIMO communication system.

It should be noted that the first linear module 3031 includes a filter and a first linear superimposer, a filtering coefficient of each filter corresponds to one transmit channel, each filter is configured to perform first filtering on a digital signal of one transmit channel to obtain one first filtering result, and the first linear superimposer is configured to perform first linear superposition on N first filtering results to obtain one first linear superposition result.

An implementation in which each filter in the first linear module 3031 performs first filtering on the digital signals of the N transmit channels may be: performing a convolution operation on each TX signal and a corresponding filtering coefficient. The filtering coefficient on which the convolution operation is performed with the TX signal may be expressed as TW, and therefore filtering coefficients corresponding to the N TX signals TX 1, TX 2, . . . , and TX N are respectively TW 1, TW 2, . . . , and TW N. When the digital signal in the MIMO communication system includes dual frequencies, the digital signals of the N transmit channels are digital signals that belong to a same frequency.

A manner in which each filter in the second linear module 3033 performs linear processing on the non-linear processing result to determine one PIM cancellation signal may be: performing a convolution operation on the non-linear processing result and a filtering coefficient corresponding to each receive channel. The filtering coefficient on which the convolution operation is performed with the non-linear processing result may be expressed as RW, and therefore filtering coefficients corresponding to the N receive channels are respectively RW 1, RW 2, . . . , and RW N.

It may be learned from the foregoing technical solutions that the PIM cancellation apparatus provided in this application includes a first obtaining unit, a second obtaining unit, a PIM simulation unit, and a cancellation unit. The first obtaining unit is configured to obtain digital signals of N transmit channels, where N is an integer greater than 1. The second obtaining unit is configured to obtain receive signals of N receive channels, where the receive signals include a PIM signal, and the PIM signal is generated from the digital signals of the N transmit channels. The PIM simulation unit is connected to the first obtaining unit, and one PIM simulation unit is integrated into a chip and is configured to obtain N PIM cancellation signals based on the digital signals of the N transmit channels, where the PIM cancellation signal is used to cancel the PIM signal in the receive signals. The PIM simulation unit includes a first linear module, a non-linear module, and a second linear module that are connected in series. The first linear module is configured to perform first filtering and first linear superposition on the digital signals of the N transmit channels to obtain a first linear superposition result. The non-linear module is configured to perform non-linear processing on the first linear superposition result to obtain a non-linear processing result. The second linear module includes N filters, a filtering coefficient of each filter corresponds to one receive channel, and each filter is configured to perform linear processing on the non-linear processing result to determine one PIM cancellation signal, so that the N PIM cancellation signals are obtained by using the second linear module. The cancellation unit connected to the second obtaining unit and the PIM simulation unit may obtain N cancellation result signals based on the receive signals and the N PIM cancellation signals. A PIM cancellation signal in a MIMO communication system can be accurately simulated by using the apparatus, to cancel a PIM signal. In addition, because N receive channels multiplex a same second linear module, a PIM cancellation signal corresponding to each receive channel may be obtained by using one second linear module, and there is no need to construct one PIM simulation unit for each receive channel. In this way, occupation of chip resources during PIM signal cancellation is reduced.

It may be understood that a problem such as a defective part, screw loosening, and vibration may occur on more than one part of the multi-channel MIMO communication system; in other words, one or more PIM sources may exist in the multi-channel MIMO communication system. When radiation PIM in the MIMO communication system is formed at one PIM source, the PIM cancellation apparatus 300 includes one PIM simulation unit 303, and the PIM simulation unit 303 may be used to simulate a PIM cancellation signal, to cancel a PIM signal in the receive signals of the receive channels that is generated at the PIM source. It is assumed that one PIM simulation unit 303 is integrated into S chips. Because the N receive channels in this embodiment of this application multiplex the same PIM simulation unit 303, there is no need to construct one PIM simulation unit 303 for each receive channel (in this case, N×S chips may be used). In the apparatus provided in this embodiment of this application, only S chips are required to implement PIM cancellation, and therefore use of chip resources is reduced.

Figure 6:
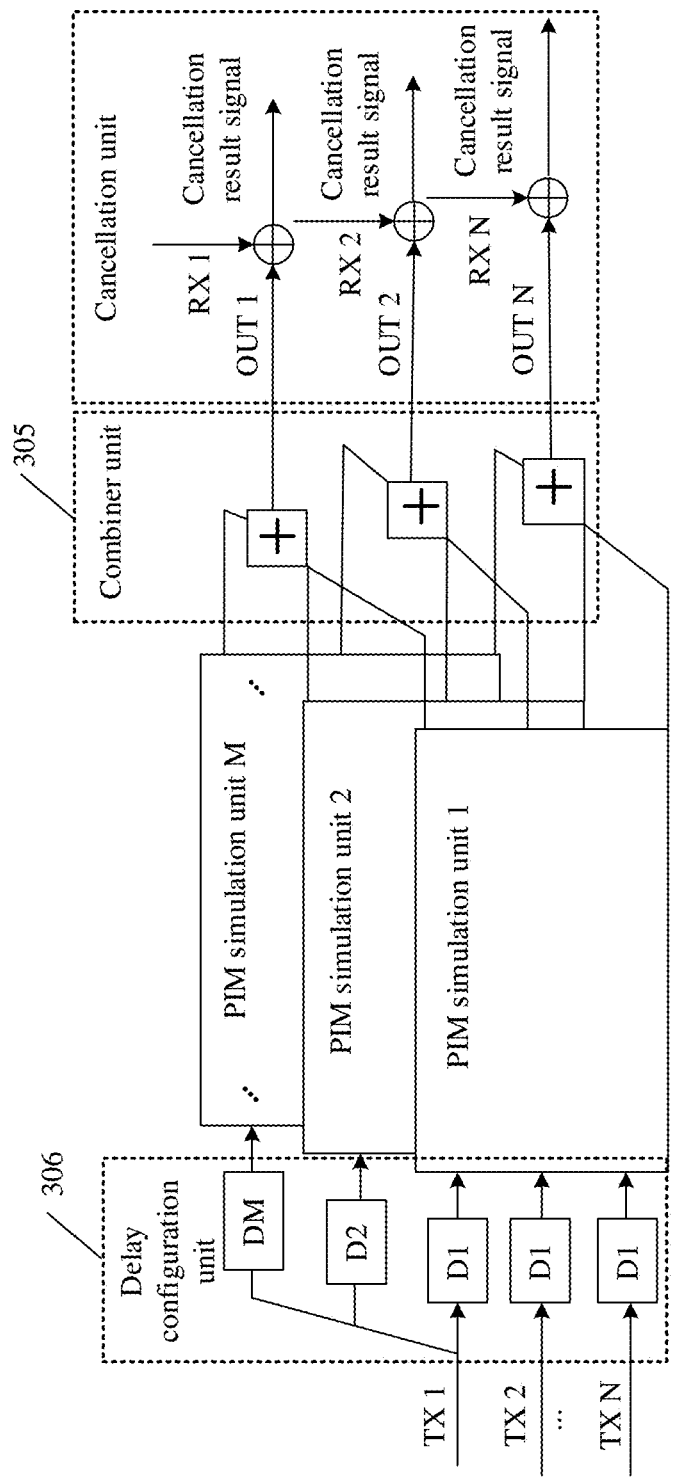
FIG. 6 is a diagram of a structure of a PIM cancellation apparatus according to an embodiment of this application.

When radiation PIM in the MIMO communication system is formed at M PIM sources, a corresponding PIM signal may be generated at each fault point, and PIM signals formed on the M PIM sources jointly affect a receive signal received by the receive channel. Generally, one PIM simulation unit may be configured to simulate a PIM signal formed at one PIM source. When the radiation PIM in the multi-channel MIMO communication system is formed at a plurality of PIM sources, the PIM cancellation apparatus 300 may include M PIM simulation units that are connected in parallel, as shown in FIG. 6. In this way, PIM cancellation signals formed at the M PIM sources on the receive channels may be obtained by using the M PIM simulation units that are connected in parallel.

A PIM signal formed at each PIM source affects a receive signal corresponding to the receive channel. Therefore, to cancel a PIM signal in the receive signal, an integrated PIM signal formed at the M PIM sources needs to be obtained, to eliminate impact exerted on the receive signal by the PIM signal formed at the M PIM sources. Therefore, in this embodiment, the PIM cancellation apparatus 300 may further include a combiner unit 305. The cancellation unit 304 is connected to each PIM simulation unit 303 by using the combiner unit 305. The combiner unit 305 is configured to add PIM cancellation signals corresponding to a same receive channel that are obtained by the M PIM simulation units, to obtain the N PIM cancellation signals.

A receive channel 1 in the N receive channels is used as an example. A digital signal corresponding to a transmit channel 1 corresponding to the receive channel 1 is TX 1, a receive signal is RX 1, M PIM cancellation signals obtained by M PIM simulation units based on TX 1 are separately OUT 1-1, OUT 1-2, . . . , and OUT 1-M, and OUT 1-1, OUT 1-2, . . . , and OUT 1-M jointly affect the receive signal RX 1. Therefore, to eliminate impact exerted by a PIM signal, OUT 1-1, OUT 1-2, . . . , and OUT 1-M need to be added to obtain OUT 1, to cancel OUT 1 from RX 1. PIM cancellation signals OUT 2, . . . , and OUT N corresponding to other receive channels may be obtained by using a same method.

It may be understood that, when the radiation PIM in the MIMO communication system is formed at a plurality of PIM sources, because locations of the plurality of PIM sources may be different, different time is used when digital signals (TX signals) of transmit channels are formed at different PIM sources, but the PIM cancellation apparatus performs PIM cancellation at a same time. To compensate for a time difference of the TX signals formed at the different PIM sources, in this embodiment, the PIM cancellation apparatus 300 may further include M delay configuration units 306. The PIM simulation unit is connected to the first obtaining unit 301 by using the delay configuration unit 306, and each delay configuration unit 306 is configured to separately configure delay values for the digital signals of the N transmit channels. Because each delay configuration unit may configure a delay value for a digital signal corresponding to one PIM source, delay values configured by different delay configuration units are usually different. In this case, the first obtaining unit 301 may obtain a digital signal configured with the delay value.

In addition, the same delay configuration unit 306 may configure delay values for digital signals corresponding to a same PIM source, and the same delay configuration unit 306 configures a same delay value for digital signals corresponding to each transmit channel.

Referring to FIG. 6, a delay value configured by the delay configuration unit 306 for a first PIM source may be denoted by D1, a delay value configured by the delay configuration unit 306 for a second PIM source may be denoted by D2, . . . , and a delay value configured by the delay configuration unit 306 for an $M^{th}$ PIM source may be denoted by DM.

It may be understood that if one PIM simulation unit 303 is integrated into S chips, when the radiation PIM in the MIMO communication system is formed at a plurality of PIM sources, because M PIM simulation units 303 need to be constructed, M×S chip resources are occupied.

When the radiation PIM in the MIMO communication system is formed at a plurality of PIM sources, to further reduce occupation of chip resources, a quantity of taps of filters in the first linear module 3031 and the second linear module 3033 in each PIM simulation unit 303 may be reduced, and functions that need to be implemented by the first linear module 3031 and the second linear module 3033 are implemented by using a linear module on an outer layer of the PIM simulation unit 303. In this case, the PIM cancellation apparatus 300 may further include a third linear module 307 and a fourth linear module 308.

Figure 7:
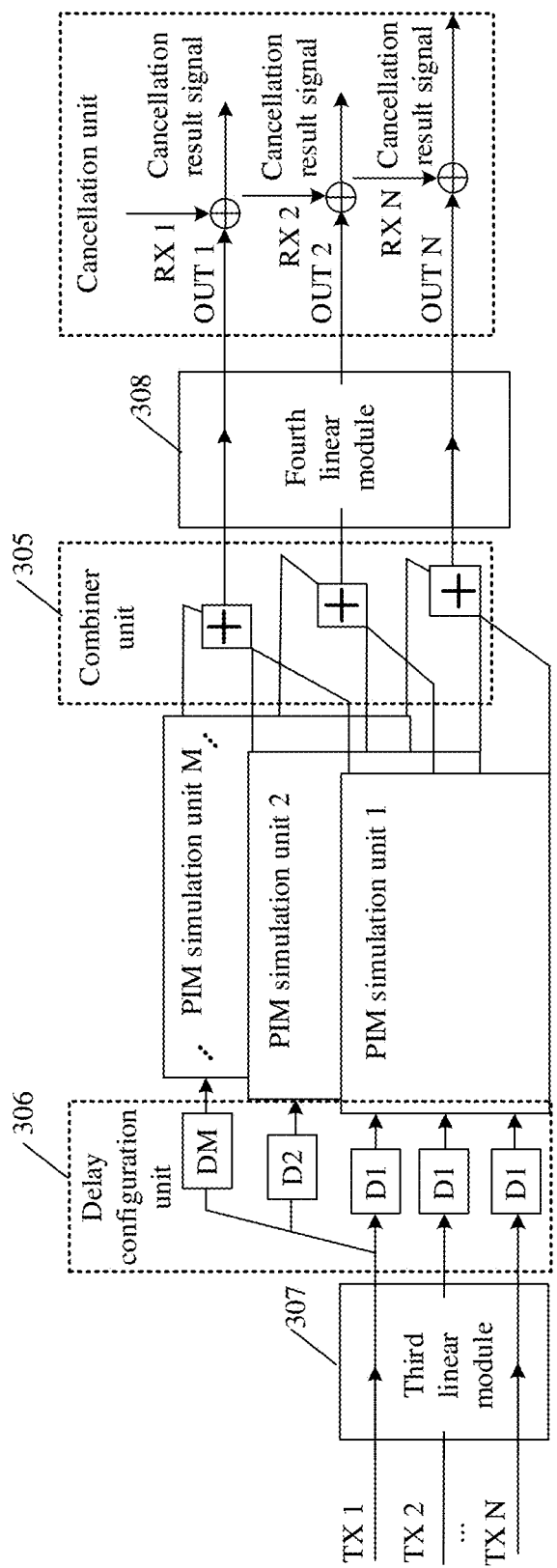
FIG. 7 is a diagram of a structure of a PIM cancellation apparatus according to an embodiment of this application.

Referring to FIG. 7, the third linear module 307 is connected to each delay configuration unit 306, and is configured to separately perform second filtering on the digital signals of the N transmit channels (for example, TX 1, TX 2, . . . , and TX N), to obtain filtered digital signals. In this case, the delay configuration unit 306 may separately configure delay values for the digital signals obtained after the N transmit channels are filtered. The fourth linear module 308 is connected to the combiner unit 305, and is configured to perform third filtering on the N PIM cancellation signals, and the cancellation unit 304 may obtain N cancellation result signals based on the receive signals and the N PIM cancellation signals on which the third filtering is performed. The quantity of taps of the filters in the first linear module and the second linear module is less than a quantity of taps of filters in the third linear module and the fourth linear module. The filter used in this embodiment may be a finite impulse response (FIR) filter or an infinite impulse response (IIR) filter.

Figure 8:
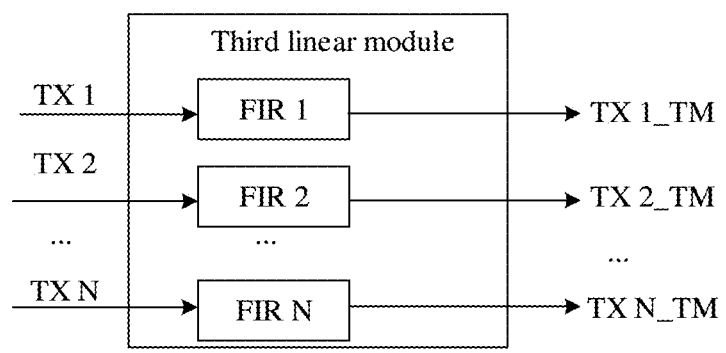
FIG. 8 is a diagram of a structure of a third linear module according to an embodiment of this application.

The third linear module 307 separately performs linear convolution (for example, FIR linear convolution) processing on the TX signals of the N transmit channels. If the filter in the third linear module 307 is a FIR filter, refer to FIG. 8 for the third linear module 307. The third linear module 307 separately performs second filtering on the digital signals (for example, TX 1, TX 2, . . . , and TX N) of the N transmit channels, to obtain filtered digital signals, and the filtered digital signals may be respectively expressed as TX 1_TM, TX 2_TM, . . . , and TX N_TM. An architecture of the fourth linear module 308 is consistent with an architecture of the third linear module 307, except that an input signal is correspondingly changed to a PIM cancellation signal.

When the radiation PIM in the MIMO communication system is formed at a plurality of PIM sources, the third linear module 307 and the fourth linear module 308 are constructed by reducing the quantity of taps of the filters in the first linear module 3031 and the second linear module 3033, and it is ensured that the quantity of taps of the filters in the first linear module 3031 and the second linear module 3033 is less than the quantity of taps of the filters in the third linear module 307 and the fourth linear module 308. In this way, occupation of chip resources is reduced.

If the filter is a FIR filter, a quantity of taps of FIR filters in the third linear module 307 and the fourth linear module 308 is F1, and a quantity of taps of FIR filters in the first linear module 3031 and the second linear module 3033 is F2 (F1>F2), when the radiation PIM applied to the MIMO communication system is formed at a plurality of PIM sources, F2×M×S/F1 chip resources are required.

A group of typical values is used as an example. If N=16, F2=3, F1=21, and M=8 for the N transmit channels and the N receive channels in the MIMO communication system, based on the apparatus provided in this embodiment, a total of F2×M×S/F1=8×S/7 chip resources are required. In this way, a quantity of required chip resources is reduced.

It should be noted that in this embodiment, locations of the PIM cancellation apparatus in the MIMO communication system are flexible and variable, and the PIM cancellation apparatus may be disposed at different locations in the MIMO communication system.

Figure 9:
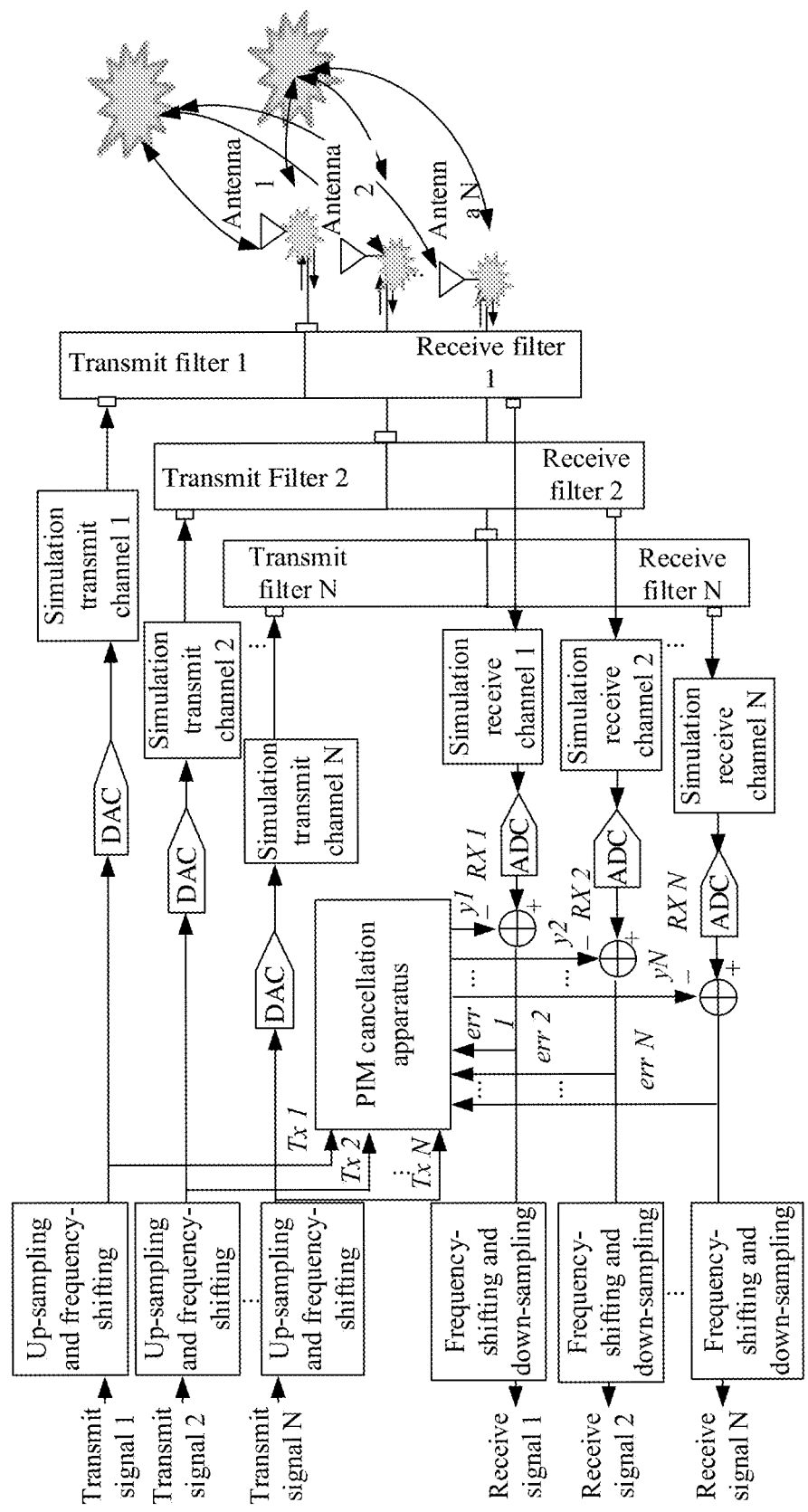
FIG. 9 is a schematic diagram in which a PIM cancellation apparatus is disposed at a location of an intermediate radio frequency digital front end according to an embodiment of this application.

In some cases, the MIMO communication system includes an up-sampling and frequency-shifting module, and the up-sampling and frequency-shifting module may perform up-sampling and frequency-shifting on baseband signals of the N transmit channels to obtain the digital signals (usually digital intermediate frequency signals) of the N transmit channels. In this case, in a possible implementation of this embodiment of this application, the PIM cancellation apparatus is disposed at a location of an intermediate radio frequency digital front end. Referring to FIG. 9, on a transmit channel, a baseband signal is generated by using a memory (for example, a double data rate (DDR) memory or a random access memory (RAM)) or a baseband unit (BBU); the baseband signal undergoes up-sampling and frequency-shifting to obtain a digital intermediate frequency signal; the digital intermediate frequency signal enters an analog transmit channel through a digital to analog converter (DAC); after being filtered by a transmit filter, the digital intermediate frequency signal is transmitted to space by using an antenna, and a multi-antenna radiate-type PIM signal is formed in space, and is then received by an analog channel by using a receive filter; and a PIM signal in the receive signal is cancelled by the PIM cancellation apparatus. In this case, the up-sampling and frequency-shifting module performs up-sampling and frequency-shifting on the baseband signals of the N transmit channels. Therefore, the digital signal obtained by the PIM cancellation apparatus by using the first obtaining unit 301 is a channel-level signal, and one digital signal (for example, TX 1) includes a plurality of carriers.

Figure 10:
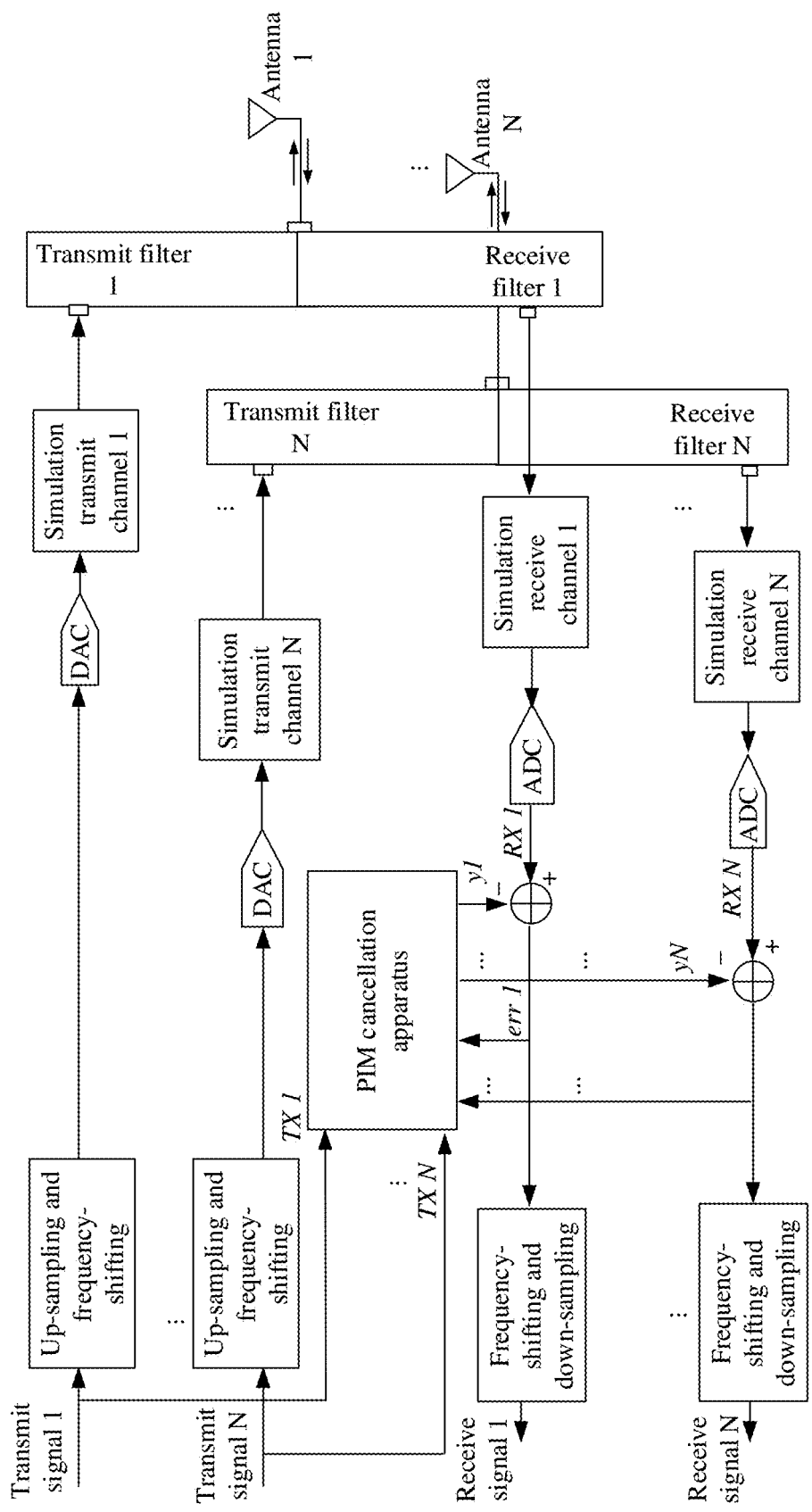
FIG. 10 is a schematic diagram in which a PIM cancellation apparatus is disposed at a baseband location according to an embodiment of this application.

Certainly, because a quantity of required chip resources at a baseband location in the MIMO communication system is less than a quantity of required chip resources at the location of the intermediate radio frequency digital front end, to further reduce the quantity of required chip resources, this embodiment of this application further provides another possible implementation of disposing the PIM cancellation apparatus at the baseband location. Referring to FIG. 10, an entire process in which a transmit signal enters a transmit channel and a receive signal enters a receive channel is similar to a corresponding process in FIG. 9. Details are not described herein again. However, when the PIM cancellation apparatus is used to cancel the PIM signal in the receive signals, if the up-sampling and frequency-shifting module has not performed up-sampling and frequency-shifting on the digital signal obtained by the PIM cancellation apparatus by using the first obtaining unit 301, the digital signal obtained by the PIM cancellation apparatus by using the first obtaining unit 301 is a carrier-level signal, and one digital signal (for example, TX 1) includes one carrier.

Figure 11:
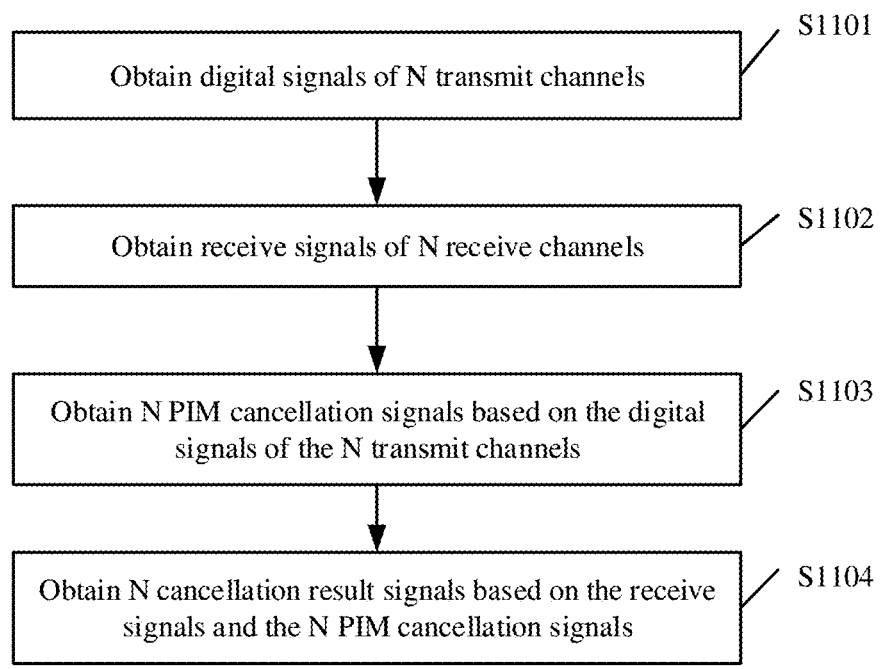
FIG. 11 is a flowchart of a PIM cancellation method according to an embodiment of this application.

Based on the PIM cancellation apparatus provided in the foregoing embodiment, an embodiment further provides a PIM cancellation method. Referring to FIG. 11, the method includes the following steps.

S1101: Obtain digital signals of N transmit channels.

N is an integer greater than 1.

S1102: Obtain receive signals of N receive channels.

The receive signals include a PIM signal, and the PIM signal is generated from the digital signals of the N transmit channels.

S1103: Obtain N PIM cancellation signals based on the digital signals of the N transmit channels.

The PIM cancellation signal is used to cancel the PIM signal in the receive signals. The obtaining N PIM cancellation signals based on the digital signals of the N transmit channels includes: performing first filtering and first linear superposition on the digital signals of the N transmit channels to obtain a first linear superposition result; performing non-linear processing on the first linear superposition result to obtain a non-linear processing result; and performing linear processing on the non-linear processing by using each filter, to determine one PIM cancellation signal, where a filtering coefficient of each filter corresponds to one receive channel, so that the N PIM cancellation signals are obtained.

S1104: Obtain N cancellation result signals based on the receive signals and the N PIM cancellation signals.

In a possible implementation, if radiation PIM in a multiple-input multiple-output MIMO communication system is formed at one PIM source, the step of obtaining N PIM cancellation signals based on the digital signals of the N transmit channels is performed by one PIM simulation unit.

In a possible implementation, if radiation PIM in a multiple-input multiple-output MIMO communication system is formed at M PIM sources, the step of obtaining N PIM cancellation signals based on the digital signals of the N transmit channels is performed by M PIM simulation units that are connected in parallel.

In a possible implementation, the method further includes: adding PIM cancellation signals corresponding to a same receive channel, to obtain the N PIM cancellation signals.

In a possible implementation, the method further includes: separately configuring delay values for the digital signals of the N transmit channels, where delay values configured by different delay configuration units are different; and the obtaining digital signals of N transmit channels includes: obtaining a digital signal configured with the delay value.

In a possible implementation, the method further includes: performing second filtering on the digital signals of the N transmit channels to obtain filtered digital signals; and the separately configuring delay values for the digital signals of the N transmit channels includes: separately configuring delay values for the digital signals obtained after the N transmit channels are filtered; performing third filtering on the N PIM cancellation signals; and obtaining the N cancellation result signals based on the receive signals and the N PIM cancellation signals on which the third filtering is performed.

In a possible implementation, the performing first filtering and first linear superposition on the digital signals of the N transmit channels to obtain a first linear superposition result includes: performing first filtering on a digital signal of one transmit channel to obtain one first filtering result, and performing first linear superposition on N first filtering results to obtain one first linear superposition result.

In a possible implementation, the MIMO communication system includes a plurality of chips, and signal transmission channels are established between the plurality of chips, so that each chip processes digital signals of N transmit channels and receive signals of N receive channels.

In a possible implementation, the digital signal is a channel-level signal.

In a possible implementation, the digital signal is a carrier-level signal.

An embodiment of this application further provides a device, including: a processor and a memory, and the processor and the memory communicate with each other. The memory is configured to store instructions. The processor is configured to execute the instructions in the memory to perform the related method in FIG. 11.

An embodiment of this application further provides a computer storage medium for storing one or more programs, and a computer program is stored on the computer storage medium. When the computer program is run on a computer, the computer is enabled to perform the related method in FIG. 11.

An embodiment of this application further provides a computer program product including instructions. When the computer program product is run on a computer, the computer is enabled to perform the related method in FIG. 11.

An embodiment of this application provides a chip system, and the chip system includes a processor used by a PIM cancellation apparatus to perform the related method in FIG. 11, for example, obtaining digital signals of N transmit channels, where N is an integer greater than 1; obtaining receive signals of N receive channels, where the receive signals include a PIM signal, and the PIM signal is generated from the digital signals of the N transmit channels; and obtaining N PIM cancellation signals based on the digital signals of the N transmit channels, where the PIM cancellation signal is used to cancel the PIM signal in the receive signals. The obtaining N PIM cancellation signals based on the digital signals of the N transmit channels includes: performing first filtering and first linear superposition on the digital signals of the N transmit channels to obtain a first linear superposition result; performing non-linear processing on the first linear superposition result to obtain a non-linear processing result; performing linear processing on the non-linear processing by using each filter, to determine one PIM cancellation signal, where a filtering coefficient of each filter corresponds to one receive channel, so that the N PIM cancellation signals are obtained; and obtaining N cancellation result signals based on the receive signals and the N PIM cancellation signals.

In a possible design, the chip system further includes a memory. The memory is configured to store program instructions and data that are necessary for a terminal device. The chip system may include a chip and an integrated circuit, or may include a chip and another discrete device. This is not specifically limited in this embodiment of this application.

The PIM cancellation apparatus, the computer storage medium, the computer program product, and the chip system provided in this application are all used to perform the foregoing PIM cancellation method. Therefore, for beneficial effects that can be achieved by the PIM cancellation apparatus, the computer storage medium, the computer program product, and the chip system, refer to beneficial effects in the foregoing implementations. Details are not described herein again.

It can be learned by a person of ordinary skill in the art that, in combination with the examples described in the embodiments disclosed in this specification, units and algorithm steps can be implemented by electronic hardware, computer software, or a combination of electronic hardware and computer software. How these functions are implemented depends on specific applications and design constraints of the technical solution. A person skilled in the art may use different methods to implement the described functions for each particular application, but it should not be considered that the implementation goes beyond the scope of this application.

Specific electronic hardware may include a dedicated or general-purpose chip, a field programmable gate array, a discrete device, and an application specific integrated circuit (ASIC) such as an analog integrated circuit (IC), a digital integrated circuit, or an analog/digital hybrid integrated circuit. A specific implementation form is not limited in this application.

In the several embodiments provided in this application, it should be understood that the disclosed system, apparatus, and method may be implemented in other manners. For example, the described device embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or other forms.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising circuitry configured to implement:
    a first obtaining unit, configured to obtain digital signals of N transmit channels, wherein N is an integer greater than 1;
    a second obtaining unit, configured to obtain receive signals of N receive channels, wherein the receive signals comprise a passive intermodulation (PIM) signal, and the PIM signal is generated from the digital signals of the N transmit channels;
    M PIM simulation units coupled in parallel and connected to the first obtaining unit, wherein the M PIM simulation units are integrated into a chip and are configured to obtain N PIM cancellation signals based on the digital signals of the N transmit channels, wherein the N PIM cancellation signals are used to cancel the PIM signal in the receive signals, and each PIM simulation unit of the M PIM simulation units comprises circuitry configured to implement a first linear module, a non-linear module, and a second linear module that are connected in series, wherein the first linear module is configured to perform first filtering and first linear superposition on the digital signals of the N transmit channels to obtain a first linear superposition result, the non-linear module is configured to perform non-linear processing on the first linear superposition result to obtain a non-linear processing result, and the second linear module comprises N filters, wherein a filtering coefficient of each filter corresponds to one respective receive channel of the N receive channels, and each filter is configured to perform linear processing on the non-linear processing result to determine one PIM cancellation signal, and the N PIM cancellation signals are obtained by using the second linear module, and wherein M is an integer greater than 1;
    a cancellation unit connected to the second obtaining unit and the PIM simulation unit, wherein the cancellation unit is configured to obtain N cancellation result signals based on the receive signals and the N PIM cancellation signals, wherein radiation PIM in a multiple-input multiple-output (MIMO) communication system is formed at M PIM sources; and
    circuitry configured to implement a combiner unit, wherein the cancellation unit is connected to each PIM simulation unit of the M PIM simulation units using the combiner unit, and the combiner unit is configured to add PIM cancellation signals corresponding to a same receive channel that are obtained by the M PIM simulation units, to obtain the N PIM cancellation signals.

2. The apparatus according to claim 1, wherein the apparatus further comprises circuitry configured to implement M delay configuration units;
wherein each PIM simulation unit is connected to the first obtaining unit using the M delay configuration units, each delay configuration unit is configured to separately configure delay values for the digital signals of the N transmit channels, and delay values configured by different delay configuration units are different; and
wherein the first obtaining unit being configured to obtain the digital signals of the N transmit channels comprises:
the first obtaining unit being configured to obtain a digital signal configured with a corresponding delay value from each delay configuration unit.

3. The apparatus according to claim 2, wherein the apparatus further comprises circuitry configured to implement a third linear module and a fourth linear module;
wherein the third linear module is connected to each delay configuration unit, and is configured to separately perform second filtering on the digital signals of the N transmit channels to obtain filtered digital signals;
wherein each delay configuration unit being configured to separately configure delay values for the digital signals of the N transmit channels comprises:
each delay configuration unit being configured to separately configure delay values for the digital signals obtained after the N transmit channels are filtered;
wherein the fourth linear module is connected to the combiner unit, and is configured to perform third filtering on the N PIM cancellation signals, wherein a quantity of taps of filters in the first linear module and the second linear module is less than a quantity of taps of filters in the third linear module and the fourth linear module; and
wherein the cancellation unit is configured to obtain the N cancellation result signals based on the receive signals and the N PIM cancellation signals on which the third filtering is performed.

4. The apparatus according to claim 1, wherein the first linear module comprises first linear module filters and a first linear superimposer, a filtering coefficient of each first linear module filter corresponds to one respective transmit channel, each first linear module filter is configured to perform the first filtering on a digital signal of one transmit channel to obtain one first filtering result, and the first linear superimposer is configured to perform the first linear superposition on N first filtering results to obtain one first linear superposition result.

5. The apparatus according to claim 1, wherein the multiple-input multiple-output (MIMO) communication system comprises a plurality of chips, and signal transmission channels are established between the plurality of chips, and each chip processes the digital signals of the N transmit channels and receive signals of the N receive channels.

6. The apparatus according to claim 1, wherein each digital signal of the digital signals is a channel-level signal.

7. The apparatus according to claim 1, wherein each digital signal of the digital signals is a carrier-level signal.

8. A method, comprising:
obtaining digital signals of N transmit channels, wherein N is an integer greater than 1;
obtaining receive signals of N receive channels, wherein the receive signals comprise a passive intermodulation (PIM) signal, and the PIM signal is generated from the digital signals of the N transmit channels;
obtaining N PIM cancellation signals based on the digital signals of the N transmit channels, wherein the N PIM cancellation signals are used to cancel the PIM signal in the receive signals, and wherein obtaining the N PIM cancellation signals based on the digital signals of the N transmit channels comprises performing M parallel PIM simulations, wherein performing each of the M PIM simulations comprises: performing first filtering and first linear superposition on the digital signals of the N transmit channels to obtain a first linear superposition result; performing non-linear processing on the first linear superposition result to obtain a non-linear processing result; and performing linear processing on the non-linear processing result using each filter to determine one respective PIM cancellation signal, wherein a filtering coefficient of each filter corresponds to one respective receive channel, and the N PIM cancellation signals are obtained, and wherein M is an integer greater than 1;
obtaining N cancellation result signals based on the receive signals and the N PIM cancellation signals, wherein radiation PIM in a multiple-input multiple-output (MIMO) communication system is formed at M PIM sources; and
adding PIM cancellation signals corresponding to a same receive channel, to obtain the N PIM cancellation signals.

9. The method according to claim 8, further comprising:
separately configuring delay values for the digital signals of the N transmit channels, wherein the delay values are different from each other; and
wherein obtaining the digital signals of the N transmit channels comprises:
obtaining a digital signal configured with each delay value.

10. The method according to claim 9, further comprising:
performing second filtering on the digital signals of the N transmit channels to obtain filtered digital signals; and
wherein separately configuring the delay values for the digital signals of the N transmit channels comprises:
separately configuring delay values for the digital signals obtained after the N transmit channels are filtered;
wherein the method further comprises:
performing third filtering on the N PIM cancellation signals; and
wherein obtaining the N cancellation result signals based on the receive signals and the N PIM cancellation signals comprises:
obtaining the N cancellation result signals based on the receive signals and the N PIM cancellation signals on which the third filtering is performed.

11. The method according to claim 8, wherein performing the first filtering and the first linear superposition on the digital signals of the N transmit channels to obtain the first linear superposition result comprises:
for each of the N transmit channels, performing the first filtering on a digital signal of the respective transmit channel to obtain one first filtering result, to obtain N first filtering results, and performing the first linear superposition on the N first filtering results to obtain one first linear superposition result.

12. The method according to claim 8, wherein the multiple-input multiple-output (MIMO) communication system comprises a plurality of chips, and signal transmission channels are established between the plurality of chips, so that each chip processes the digital signals of the N transmit channels and receive signals of the N receive channels.

13. The method according to claim 8, wherein each digital signal of the digital signals is a channel-level signal.

14. The method according to claim 8, wherein each digital signal of the digital signals is a carrier-level signal.

15. An apparatus, comprising:
   at least one processor; and
   a memory coupled to the at least one processor with instructions stored thereon, wherein the instructions, when executed by the at least one processor, enable the apparatus to perform the steps of:
   obtaining digital signals of N transmit channels, wherein N is an integer greater than 1,
   obtaining receive signals of N receive channels, wherein the receive signals comprise a passive intermodulation (PIM) signal, and the PIM signal is generated from the digital signals of the N transmit channels,
   obtaining N PIM cancellation signals based on the digital signals of the N transmit channels, wherein the N PIM cancellation signals are used to cancel the PIM signal in the receive signals, and wherein obtaining the N PIM cancellation signals based on the digital signals of the N transmit channels comprises performing M parallel PIM simulations, wherein performing each of M parallel PIM simulations comprises: performing first filtering and first linear superposition on the digital signals of the N transmit channels to obtain a first linear superposition result; performing non-linear processing on the first linear superposition result to obtain a non-linear processing result; and performing linear processing on the non-linear processing result using each filter to determine one respective PIM cancellation signal, wherein a filtering coefficient of each filter corresponds to one respective receive channel, and the N PIM cancellation signals are obtained, and wherein M is an integer greater than 1;
   obtaining N cancellation result signals based on the receive signals and the N PIM cancellation signals, wherein radiation PIM in a multiple-input multiple-output (MIMO) communication system is formed at M PIM sources; and
   adding PIM cancellation signals corresponding to a same receive channel, to obtain the N PIM cancellation signals.

16. The apparatus according to claim 15, wherein the instructions, when executed by the at least one processor, further enable the apparatus to perform, separately configuring delay values for the digital signals of the N transmit channels, wherein the delay values are different from each other, wherein obtaining the digital signals of the N transmit channels comprises obtaining a digital signal configured with each delay value.

17. The apparatus according to claim 16, wherein the instructions, when executed by the at least one processor, further enable the apparatus to perform second filtering on the digital signals of the N transmit channels to obtain filtered digital signals.

18. The apparatus according to claim 15, wherein performing the first filtering and the first linear superposition on the digital signals of the N transmit channels to obtain the first linear superposition result comprises:
   for each of the N transmit channels, performing the first filtering on a digital signal of the respective transmit channel to obtain one first filtering result, to obtain N first filtering results, and performing the first linear superposition on the N first filtering results to obtain one first linear superposition result.

19. The apparatus according to claim 15, wherein each digital signal of the digital signals is a channel-level signal.

20. The apparatus according to claim 15, wherein each digital signal of the digital signals is a carrier-level signal.

* * * * *

UNITED STATES PATENT AND TRADEMARK OFFICE
CERTIFICATE OF CORRECTION

PATENT NO. : 12,267,096 B2
APPLICATION NO. : 17/653980
DATED : April 1, 2025
INVENTOR(S) : Wang et al.

Page 1 of 1

It is certified that error appears in the above-identified patent and that said Letters Patent is hereby corrected as shown below:

In the Claims

In Column 17, in Claim 5, Line 58, after "and" delete "receive" and insert -- receives --.

In Column 19, in Claim 12, Line 3, after "and" delete "receive" and insert -- receives --.

Signed and Sealed this
Twentieth Day of May, 2025

Coke Morgan Stewart
*Acting Director of the United States Patent and Trademark Office*